United States Patent [19]

Reimer

[11] Patent Number: 5,080,921
[45] Date of Patent: Jan. 14, 1992

[54] LOW CALORIE FAT SUBSTITUTE

[75] Inventor: Robert A. Reimer, New York, N.Y.

[73] Assignee: Pfizer Inc., New York, N.Y.

[21] Appl. No.: 474,973

[22] Filed: Feb. 5, 1990

[51] Int. Cl.⁵ .............................................. A23L 1/29
[52] U.S. Cl. ...................................... 426/564; 426/565;
426/589; 426/602; 426/605; 426/613; 426/659;
426/804
[58] Field of Search ............... 426/601, 602, 603, 604,
426/613, 804, 658, 656, 657, 564, 565, 589

[56] References Cited

U.S. PATENT DOCUMENTS

| 3,642,490 | 2/1972 | Hawlej | 99/17 |
|---|---|---|---|
| 3,642,492 | 1/1972 | Arndt | 99/64 |
| 3,642,493 | 2/1972 | Arndt | 99/64 |
| 3,689,288 | 9/1972 | Duren | 99/139 |
| 3,692,543 | 9/1972 | Powell | 99/144 |
| 3,708,307 | 1/1973 | Lonstedt | 99/57 |
| 3,723,407 | 3/1973 | Miller | 260/123.5 |
| 3,737,326 | 6/1973 | Basso | 99/78 |
| 3,757,005 | 9/1973 | Kautz | 260/113 |
| 3,793,464 | 2/1974 | Rusch | 426/89 |
| 3,798,339 | 3/1974 | Chung-Yen Peng | 426/357 |
| 3,800,052 | 3/1974 | Inagani | 426/359 |
| 3,829,592 | 8/1974 | Bratland | 426/491 |
| 3,842,062 | 10/1974 | Eastman | 260/112 R |
| 3,843,828 | 10/1974 | Arndt | 426/360 |
| 3,852,503 | 12/1974 | Mangino | 426/364 |
| 3,853,839 | 12/1974 | Mangino | 260/123.5 |
| 3,865,956 | 2/1975 | Fukushima | 426/195 |
| 3,870,811 | 3/1975 | Schulz | 426/348 |
| 3,873,751 | 3/1975 | Arndt | 426/356 |
| 3,891,778 | 6/1975 | Boyer | 426/573 |
| 3,892,873 | 7/1975 | Koler | 426/602 |
| 3,899,605 | 8/1975 | Schapp | 426/582 |
| 3,914,435 | 10/1975 | Macbois | 426/40 |
| 3,917,859 | 11/1975 | Terada | 426/602 |
| 3,922,375 | 11/1975 | Dalan | 426/583 |
| 3,922,376 | 11/1975 | Strinning | 426/603 |
| 3,929,892 | 12/1975 | Hynes | 426/582 |
| 3,930,039 | 12/1975 | Kuipers | 426/271 |
| 3,930,056 | 12/1975 | Feminella | 426/646 |
| 3,935,323 | 1/1976 | Feminella | 426/564 |
| 3,946,122 | 3/1976 | Scharp | 426/604 |
| 3,969,534 | 7/1976 | Pavez | 426/34 |
| 3,978,243 | 8/1976 | Pederson | 426/573 |
| 3,982,039 | 9/1976 | Scibelli | 426/602 |
| 4,000,332 | 12/1976 | Strinning | 426/603 |
| 4,007,283 | 2/1977 | Crisan | 426/34 |
| 4,018,752 | 4/1977 | Buhler | 260/112 |
| 4,025,659 | 5/1977 | Cho et al. | 426/613 |
| 4,029,825 | 6/1977 | Cheng | 426/271 |
| 4,031,261 | 6/1977 | Durst | 426/565 |
| 4,031,267 | 6/1977 | Berry | 426/656 |
| 4,046,926 | 9/1977 | Gardiner | 426/613 |
| 4,051,269 | 9/1977 | Strinning | 426/603 |
| 4,057,655 | 11/1977 | Okada | 426/583 |
| 4,058,510 | 11/1977 | Concilio-Nolan | 260/112 |
| 4,072,610 | 2/1978 | Gow | 310/90 |
| 4,079,154 | 3/1978 | Yasumatsu | 426/583 |
| 4,089,987 | 5/1978 | Chang | 426/564 |
| 4,091,116 | 5/1978 | Edwards | 426/42 |
| 4,092,438 | 5/1978 | Tonner | 426/601 |
| 4,103,037 | 7/1978 | Bodor | 426/575 |
| 4,103,038 | 7/1978 | Roberts | 426/601 |
| 4,104,413 | 8/1978 | Wynn | 426/582 |
| 4,107,343 | 8/1978 | Petricca | 426/564 |
| 4,113,716 | 9/1978 | Goml | 260/123.5 |
| 4,115,598 | 9/1978 | Morar | 426/604 |
| 4,125,630 | 11/1978 | Orthoefer | 426/104 |
| 4,137,339 | 1/1979 | Kudo | 426/634 |
| 4,143,174 | 3/1979 | Shah | 426/570 |
| 4,146,652 | 3/1979 | Kahn et al. | 426/564 |
| 4,147,810 | 4/1979 | Kellor | 426/629 |
| 4,148,808 | 2/1979 | Jonson | 426/583 |
| 4,169,160 | 9/1979 | Wingerd | 426/40 |
| 4,183,970 | 1/1980 | May | 426/583 |
| 4,186,218 | 1/1980 | Goml | 426/590 |
| 4,188,411 | 3/1980 | Kulperg | 426/582 |
| 4,192,901 | 3/1980 | Yasumatsu | 426/580 |
| 4,194,018 | 3/1980 | Hodel | 426/580 |
| 4,194,019 | 3/1980 | Yasumatsu | 426/580 |
| 4,205,094 | 5/1980 | Baird | 426/459 |
| 4,209,503 | 6/1980 | Shah | 424/49 |
| 4,209,546 | 6/1980 | Johannson | 426/603 |
| 4,212,893 | 7/1980 | Tahahata | 426/330.2 |
| 4,217,370 | 8/1980 | Rawllings | 426/98 |
| 4,218,490 | 8/1980 | Phillips | 426/549 |
| 4,228,190 | 10/1980 | Nilssor | 426/421 |
| 4,228,190 | 10/1980 | Wallgren | 426/421 |
| 4,230,738 | 8/1980 | Shener | 426/656 |
| 4,239,786 | 12/1980 | Gilmore et al. | 426/601 |
| 4,247,566 | 1/1981 | Iragami | 426/276 |
| 4,248,895 | 2/1981 | Stroz | 426/656 |
| 4,251,652 | 7/1981 | Legrard | 426/573 |
| 4,252,835 | 2/1981 | Maerker | 426/589 |
| 4,259,361 | 3/1981 | Procter | 426/285 |
| 4,260,636 | 4/1981 | Yasumatsu | 426/34 |
| 4,265,924 | 5/1981 | Buhler | 426/382 |
| 4,267,100 | 5/1981 | Chang | 260/112 |
| 4,271,201 | 6/1981 | Stenne | 426/40 |
| 4,275,084 | 6/1981 | Ohyabu | 476/104 |
| 4,279,939 | 7/1981 | Cho | 426/583 |
| 4,305,964 | 12/1981 | Moran | 426/99 |
| 4,305,970 | 12/1981 | Moran | 426/603 |
| 4,307,118 | 12/1981 | Kajs | 426/104 |
| 4,308,294 | 12/1981 | Rispoli | 426/564 |
| 4,325,977 | 4/1982 | Remer | 426/534 |
| 4,333,958 | 6/1982 | Egnell | 426/583 |
| 4,340,612 | 7/1982 | Asknon | 426/276 |
| 4,352,832 | 10/1982 | Wood | 426/589 |
| 4,362,758 | 12/1982 | MacNeill | 426/603 |
| 4,362,761 | 7/1982 | Chang | 426/657 |

(List continued on next page.)

FOREIGN PATENT DOCUMENTS 239378 9/1987 European Pat. Off. .
8908988 10/1989 PCT Int'l Appl. .

Primary Examiner—Jeanette Hunter
Attorney, Agent, or Firm—Peter C. Richardson; Paul H. Ginsburg; Robert F. Sheyka

[57] ABSTRACT

There is disclosed a low calorie fat substitute comprising a continuous aqueous phase containing carbohydrate and protein and a dispersed phase containing protein and fat.

69 Claims, No Drawings

U.S. PATENT DOCUMENTS

| | | | |
|---|---|---|---|
| 4,366,180 | 12/1982 | Altroch | 426/602 |
| 4,376,133 | 3/1983 | Farnand | 426/656 |
| 4,379,175 | 4/1983 | Baker | 426/582 |
| 4,415,600 | 11/1983 | Miller et al. | 426/613 |
| 4,446,164 | 5/1984 | Brog | 426/583 |
| 4,446,165 | 5/1984 | Roberts | 426/602 |
| 4,486,345 | 12/1984 | Calleraent | 260/123.5 |
| 4,497,836 | 2/1985 | Manquandt | 426/239 |
| 4,515,825 | 5/1985 | Moran | 426/603 |
| 4,590,086 | 5/1986 | Takahashi | 426/602 |
| 4,632,840 | 12/1986 | Takahashi | 426/602 |
| 4,650,690 | 3/1987 | Bonr | 426/602 |
| 4,693,901 | 9/1987 | Hullah | 426/330.6 |

LOW CALORIE FAT SUBSTITUTE

BACKGROUND OF THE INVENTION

The present invention is directed to low calorie fat substitutes. More specifically, it is directed to an emulsion containing protein, fat and carbohydrate which is useful as a low calorie fat substitute.

In today's health conscious society, there is a growing demand for low calorie foods. Excess body weight not only creates a feeling of low self-confidence in social situations but also has been shown to contribute to the impairment of the cardiovascular function of the individual. Moreover, the reduction of the physical performance capacity of the individual is another consequence of excess body weight.

Many approaches have been suggested to control excess body weight. The use of chemical appetite suppressors and appetite inhibitors is a well known approach but these chemical agents are often unsafe for long term use and/or have undesirable side effects. Moreover, they are usually available only through a physician's prescription.

Low-calorie foods have also been widely advocated as a diet regimen to control excess body weight. Such low-calorie foods include low-calorie spreads, which are typically water-in-oil (w/o) emulsions; and low calorie sauces, such as salad dressings and mayonnaise, which are typically oil-in-water emulsions.

One other approach generally undertaken in the production of low-calorie foods is to increase the protein content, thereby decreasing the fat content. This approach is referred to in a number of United States Patents.

U.S. Pat. Nos. 3,642,492, 3,644,326, 3,689,288, 3,708,307, 4,057,655, 3,723,407, 4,058,510, 4,079,154, 4,089,987, 4,091,116, 4,104,413, 4,113,716, 4,125,630, 4,140,808, 3,892,873, 3,899,605, 3,800,052, 3,798,339, 3,852,503, 3,853,839, 3,843,828, 3,842,062, 3,829,592, 3,865,956, 3,870,811, 3,873,751, 3,922,375, 3,930,039, 3,935,323, 3,969,534, 4,147,810, 4,307,118, 3,793,464, 3,642,490, 3,642,493, 3,914,435, 3,930,056, 4,072,610, 4,031,261, 3,757,005, 3,978,243, 3,982,039, 4,007,283, 4,018,752, 4,029,825, 4,137,329, 4,186,218, 4,194,018, 4,103,038, 4,031,267, 4,275,084, 4,271,201, 4,169,160, 4,183,970, 4,188,141, 4,194,019, 4,205,904, 4,325,977, 4,333,958, 4,143,174, 4,376,133, 4,486,345, 4,497,836, 4,560,454, 4,279,939, 4,340,612, 4,293,571, 4,362,761, 4,267,100, 4,265,924, 4,260,636, 4,259,361, 4,251,562, 4,248,895, 4,247,566, 4,218,940, and 4,230,738 all refer to the use of vegetable, animal, egg, and/or milk proteins in various compositions as well as referring to various processes for the formation of these compositions and/or improved processes for extraction and treatment of vegetable, egg, animal and/or milk proteins.

U.S. Pat. No. 3,726,690 refers to acidified imitation dairy foods comprising a fat, milk solids, or an edible protein, water or milk, an edible emulsifier, and a mixture of a Xanthomonas colloid and locust bean gum.

U.S. Pat. No. 3,891,778 refers to a low calorie spreadable food product containing the additive formed by extracting soybean protein, acidifying and then precipitating the extracted protein.

U.S. Pat. No. 3,929,892 refers to a method for making a low calorie cream cheese product comprising providing a mixture of water and cottage cheese curd, adding a fat source to the mixture to provide a substrate and adding non-fat milk solids to the substrate.

U.S. Pat. No. 4,305,964 refers to an artificial cream-type food product having a continuous liquid aqueous phase comprising a dispersed oil phase and gelled water beads.

U.S. Pat. No. 4,209,503 refers to a food containing a whey colloidal precipitate.

U.S. Pat. No. 4,212,893 refers to a acidified whole milk beverage containing locust bean gum as a stabilizer.

U.S. Pat. No. 4,305,970 refers to a water in oil emulsion (w/o) comprising a continuous fatty phase, a dispersed liquid aqueous phase and dispersed, gelled, aqueous spherical ingredients.

U.S. Pat. No. 4,379,175 refers to an imitation cream cheese product containing milk, milk-fats and dry cottage cheese curd.

U.S. Pat. No. 4,515,825 refers to a low fat spread containing a dispersed phase consisting of a cream comprising water and oil, a thickening agent and heat denatured whey protein as an emulsion stabilizer and a continuous fat phase.

U.S. Pat. No. 4,352,832 refers to a stabilized dressing containing acetic acid in combination with a buffering salt.

U.S. Pat. No. 4,252,835 refers to a base thickener comprising a mixture of glutamic acid and acetic or citric acid.

U.S. Pat. No. 4,244,983 refers to a process for making a low fat imitation cream cheese by adding dry cottage cheese curd.

U.S. Pat. No. 4,217,370 refers to a process for the production of microencapsulated lipids in proteinaceous matter.

Existing fat substitute technologies focus on the mouthfeel of foods, substituting viscosifying agents to mimic the rheology of foods rich in oils and fats. The quality of low fat foods is generally poor, being easily distinguishable from that of full fat foods. For example, in taste panel comparison of full-fat with low fat mayonnaise, the initial flavor of both is pleasant but the rich texture and mouthfeel is virtually absent from the low-fat mayonnaise. The lack of a rich mouthfeel is viewed quite negatively in taste panel testing. The most frequent comments describing this effect are "watery, weak or flat". As a result, the low-fat mayonnaise is considered to be distinctly inferior to the full-fat mayonnaise. To reduce the fat content of their diets, consumers appear to be willing to sacrifice the richness of full fat foods for the health benefits of texturally inferior low-fat products. Development of a fat substitute that possesses a rich aftertaste is perceived as a major need in the improvement of low-fat foods.

SUMMARY OF THE INVENTION

In one embodiment, the present invention is directed to a two-phase emulsion comprising a continuous aqueous phase and a dispersed phase, said emulsion comprising, based on the weight of the total emulsion, from about 1 to about 70 percent of carbohydrate, from about 0.05 to about 12 percent of protein, from about 1 to about 50 percent of an edible fat or oil, and an emulsifier; wherein substantially all of said fat or oil and at least a portion of said protein are in said dispersed phase in the form of protein-fat or protein-oil aggregates; and wherein the nonaggregated protein is either dissolved or suspended in said aqueous phase; said emulsion useful as a low calorie fat substitute.

In a preferred embodiment, the mean size of the protein-fat or protein-oil aggregates is from about 0.1 to about 100 microns.

In an especially preferred embodiment, the mean size of the protein-fat or protein-oil aggregates is from about 0.2 to about 20 microns.

In a preferred embodiment, the emulsion further comprises one or more thickening agents.

In an especially preferred embodiment, the thickening agents are selected from the group consisting of alginates, xanthan gum, locust bean gum, guar gum, agar, carrageenans, pectins, methylcellulose, methylethylcellulose, carboxymethylcellulose, hydroxypropylcellulose, hydroxypropylmethylcellulose, gelatin, and combinations thereof.

In a further preferred embodiment, the emulsion further comprises one or more pH-adjusting agents.

In a further especially preferred embodiment, the pH-adjusting agents are selected from the group consisting of phosphoric, acetic, lactic, malic, hydrochloric, sulfuric, tartaric and citric acid, salts thereof, and combinations thereof.

In another preferred embodiment, the protein is substantially purified protein, egg white, or egg white solids.

In a preferred emulsion, the purified protein is selected from the group consisting of whey protein, milk protein hydrolyzates, milk protein isolates, egg albumin, soy protein isolates, beef plasma protein; and combinations thereof.

Especially preferred purified proteins for the emulsion are egg albumin, whey protein and soy protein isolates.

In a preferred embodiment, the carbohydrate in the emulsion is selected from the group consisting of corn syrup solids, corn syrup, dextrins, sucrose, dextrose, starches, modified starches, fructose, maltodextrins, polydextrose, and polyhydric alcohols; and combinations thereof.

Preferred carbohydrates for the emulsion are polydextrose and maltodextrin.

In a preferred emulsion, the emulsifier is selected from the group consisting of lecithins, mono- and diglycerides, diacetyltartaric acid esters of mono- and diglycerides, monosodium phosphate derivatives of mono-and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, and citric acid with fatty acids or fatty alcohols, esters of acids selected from the group consisting of fumaric, lactic, tartaric, citric, acetic, and succinic with mono- or diglycerides, and combinations thereof.

In yet another preferred emulsion, the edible fat or oil is selected from the group consisting of vegetable fats and oils, hydrogenated vegetable fats and oils, partially hydrogenated canola oil, partially hydrogenated corn oil, partially hydrogenated cottonseed oil, partially hydrogenated soybean oil, partially hydrogenated sunflower oil, partially hydrogenated safflower oil; and combinations thereof.

Preferred is the emulsion wherein the protein is present at a concentration of from about 0.5 to about 5 percent.

Preferred also is the emulsion wherein the carbohydrate is present at from about 5 to about 60 percent.

Also preferred is the emulsion wherein the edible fat or oil is present in a concentration of from about 5 to about 40 percent.

In another embodiment, the present invention is directed to a foodstuff having at least a portion of the normally present triglyceride replaced by an emulsion of the present invention or an emulsion produced by the processes of the present invention.

Preferred foods into which the present emulsion may be incorporated are salad dressings, frozen desserts, soups, dips for chips, crackers or vegetables, mayonnaise, fillings for cakes and cookies, confections, cake frosting, and whipped desserts.

In another embodiment, the present invention is directed to a process for preparing an emulsion comprising:

(a) adding a fat or oil and an emulsifier to an aqueous medium in which is dissolved or suspended a protein, said aqueous medium also containing carbohydrate;

(b) stirring said mixture and heating the mixture to denature said protein so as to form protein-fat or protein-oil aggregates.

In a preferred process, the mixture is heated to a temperature in the range of from about 60° C. to about 100° C. for a time sufficient to partially denature said protein.

In a preferred process, the protein is selected from the group consisting of substantially purified protein, egg white, and egg white solids.

In a preferred process, the purified protein is selected from the group consisting of whey protein, milk protein isolates, milk protein hydrolyzates, egg albumin, soy protein isolates, beef plasma protein; and combinations thereof.

Especially preferred proteins for use in the process are egg albumin, whey protein and soy protein isolates.

In yet another preferred process, the carbohydrate is selected from the group consisting of corn syrup solids, corn syrup, dextrins, sucrose, dextrose, starches, modified starches, fructose, maltodextrins, polydextrose, and polyhydric alcohols; or combinations thereof.

Preferred carbohydrates for use in the process are polydextrose and maltodextrin.

Preferred also is the process wherein a pH-adjusting agent is added to the emulsion.

Preferred pH-adjusting agents are hydrochloric, sulfuric, phosphoric, acetic, lactic, malic, tartaric, and citric acids; salts thereof; and combinations therof.

In a preferred process, the emulsifier is selected from the group consisting of lecithins, mono- and diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, and citric with fatty acids or fatty alcohols, esters of acids selected from the group consisting of fumaric, lactic, tartaric, citric, acetic and succinic with mono- or diglycerides, and combinations thereof.

In yet another preferred process, the edible fat or oil is selected from the group consisting of vegetable fats and oils, hydrogenated vegetable fats and oils, refined animal fats, polyunsaturated oils, partially hydrogenated canola oil, partially hydrogenated corn oil, partially hydrogenated cottonseed oil, partially hydrogenated soybean oil, partially hydrogenated safflower oil, partially hydrogenated sunflower oil; and combinations thereof.

Preferred also is the process wherein a thickening agent is added to the emulsion.

Preferred thickening agents are alginates, xanthan gum, locust bean gum, guar gum, agar, carrageenans, pectins, methylcellulose, methylethylcellulose, carboxymethylcellulose, hydroxypropylcellulose, hydroxypropylmethylcellulose, and gelatin; and combinations thereof.

In yet another embodiment, the present invention is directed to a process for preparing an emulsion comprising:

(a) heating an aqueous medium in which is dissolved or suspended a protein in order to partially denature said protein, said aqueous medium also containing carbohydrate;

(b) adding said aqueous medium to a mixture of a fat or oil and an emulsifier; and (c) stirring the resulting mixture in order to form protein-fat or protein-oil aggregates.

In a preferred process, the aqueous medium is heated to a temperature in the range of about 60° C. to about 100° C. for a time sufficient to partially denature the protein.

Preferred also is the process wherein a thickening agent is added to the emulsion.

Preferred thickening agents are alginates, xanthan gum, locust bean gum, guar gum, agar, carrageenans, pectins, methylcellulose, methylethylcellulose, carboxymethylcellulose, hydroxypropylcellulose, hydroxypropylmethylcellulose, and gelatin; and combinations thereof.

Preferred also is the process wherein a pH-adjusting agent is added to the emulsion.

Preferred pH-adjusting agents are acids selected from the group consisting of hydrochloric, sulfuric, phosphoric, acetic, lactic, malic, tartaric, and citric; salts thereof; and combinations thereof.

In a preferred process, the protein is selected from the group consisting of substantially purified protein, egg white, and egg white solids.

Preferred purified proteins are whey protein, milk protein isolates, milk protein hydrolyzates, egg albumin, soy protein isolates, beef plasma protein; and combinations thereof.

Especially preferred purified proteins are soy protein isolates, whey protein, and egg albumin.

In yet another preferred process, the carbohydrate is selected from the group consisting of corn syrup solids, corn syrup, dextrins, sucrose, dextrose, starches, modified starches, fructose, maltodextrins, polydextrose, and polyhydric alcohols; and combinations thereof.

Preferred carbohydrates for use in the process are polydextrose and maltodextrin.

In a preferred process, the emulsifier is selected from the group consisting of lecithins, monoglycerides, diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric and citric with fatty acids or fatty alcohols, esters of acids selected from the group consisting of fumaric, lactic, tartaric, citric, acetic, and succinic with mono- or diglycerides; and combinations thereof.

In yet another preferred process, the edible fat or oil is selected from the group consisting of vegetable fats and oils, hydrogenated vegetable fats and oils, refined animal fats, polyunsaturated oils, partially hydrogenated canola oil, partially hydrogenated cottonseed oil, partially hydrogenated soybean oil, partially hydrogenated corn oil, partially hydrogenated safflower oil, partially hydrogenated sunflower oil; and combinations thereof.

The present invention is also directed to a method of reducing the fat content of a food containing triglycerides comprising replacing at least a portion of the normally present triglyceride with the emulsion of the present invention or with an emulsion produced by the processes of the present invention.

DETAILED DESCRIPTION OF THE INVENTION

The present invention is directed to an emulsion with a continuous aqueous phase containing protein and carbohydrate, and a dispersed phase of protein-fat or protein-oil aggregates, useful as a fat substitute in prepared foods. It imparts a pleasant taste and mouthfeel and a rich aftertaste to these foods, allowing both the fat content and the caloric content to be reduced without sacrifice of flavor or richness.

Proteins are well known to be amphipathic, i.e. surface active. When in an aqueous dispersion, they tend to migrate to air-water or oil-water interfaces. This characteristic helps to stabilize emulsions and foams and is the basis for a great number of food products such as whipped toppings, meringues, ice cream, and salad dressings.

The processes by which the emulsion of the present invention is manufactured involve exposure of protein in an aqueous medium to elevated temperature. While not wishing to be bound by theory, applicants believe that the favorable organoleptic properties of the product are in part the result of heat-induced denaturation and insolubilization of proteins, which then aggregate and cluster about emulsified fat globules. Concurrent or subsequent homogenization of the resulting emulsion, while not absolutely necessary, may assist in the aggregation and clustering processes by reducing the sizes of protein and fat particles and promoting intimate contact between them. The portion of the protein content of the emulsion which remains dissolved or suspended in the aqueous medium, together with the carbohydrate component of the aqueous medium, is believed to contribute to emulsion flavor and mouthfeel, and may further assist in formation and stabilization of emulsion structure.

Microscopic examination of emulsions of the present invention reveals that the dispersed particles of the emulsion are small (typically 1-5 microns) and irregular in shape, in contrast to the smooth spherical shapes characteristic of uncomplexed fat globules or the highly structured protein-fat globules in milk and cream. These irregular particles are believed to be globules of fat surrounded by arrays of smaller particles of denatured protein. Some of the protein particles may be coated with fat, but this appears to be a minor portion of the total protein.

Analysis by laser light scattering confirms that mean particle sizes are typically in the 1-5 micron range, but particle sizes of from 0.1 to about 100 microns are also observed.

When this emulsion is used as a fat substitute in aqueous foods, the protein-fat aggregates coat the palate imparting a rich texture and mouthfeel to the food. Removal of either the fat or protein from the emulsion has been found to affect rich texture and mouthfeel; hence, both components are essential. Adding the emulsion ingredients separately to prepared foods does not improve the texture and mouthfeel even when all the ingredients used in the emulsion are added. Thus, it is the combination of the specified ingredients which leads to the surprising qualities of the emulsion.

During preparation of the emulsion, it is important to develop a uniform texture free of lumps or granules and containing as few large particles as possible. Large particles lend a gritty, chalky or mouth-drying character to the emulsions. Further, because the volume of a particle is proportional to the cube of its radius, the presence of a few large particles will greatly decrease the amount of material available to form small particles and significantly reduce creamy mouthfeel. To minimize these effects, the mean size of the protein-fat or protein-oil aggregate should be in the range of 0.1 microns to about 100 microns and preferably in the range of about 0.2 microns to about 20 microns.

The emulsion contains from about 0.05 to about 12 percent, preferably 0.5 to 5 percent of protein, based on the weight of the emulsion. The protein can be any food grade protein. For most applications, substantially purified proteins having a bland flavor are preferred. Non-limiting examples of such purified proteins are whey protein, milk protein hydrolyzates, milk protein isolates, egg albumin, soy protein isolates, beef plasma protein; and combinations thereof. Modified derivatives of these proteins such as acidified whey and denatured or otherwise modified egg albumin can also be used. These proteins, as well as their modified derivatives, are all commercially available.

Preferred purified proteins are soy protein isolates, whey protein, and egg albumin.

Other proteins which satisfy the criterion of blandness are egg white and egg white solids.

The emulsion also contains an emulsifier. Preferred commercially available emulsifiers are lecithins, mono- and diglycerides, diacetyltartaric acid esters of mono- and diglycerides, monosodium phosphate derivatives of mono- and diglycerides, polyol fatty acid esters, sorbitan fatty acid esters, polyoxyethylene mono and diglycerides, polyoxyethylene sorbitan fatty acid esters, sucrose fatty acid esters, esters of acids selected from the group consisting of fumaric, lactic, tartaric, and citric with fatty acids or fatty alcohols, esters of acids selected from the group consisting of fumaric, lactic, tartaric, citric, acetic, and succinic with mono- or diglycerides; and combinations thereof.

The aqueous phase of the emulsion also contains from about 1 to about 70 percent, preferably 5 to 60 percent, of a carbohydrate dissolved or suspended in the aqueous phase. The carbohydrate can be any food grade carbohydrate. Preferred carbohydrates are corn syrup solids, corn syrup, dextrins, sucrose, dextrose, starches, modified starches, fructose, maltodextrins, polydextrose, polyhydric alcohols; and combinations thereof. These carbohydrates are commercially available from a variety of sources.

The dispersed phase of the emulsion also contains, based on the weight of the total emulsion, from about 1 to about 50 percent, preferably from about 5 to about 40 percent, of an edible fat or oil. Suitable fats and oils include refined animal fats, vegetable fats, vegetable oils such as canola oil, cottonseed oil, corn oil, soybean oil, safflower oil, sunflower oil, and partially hydrogenated derivatives. Combinations of these fats and oils may also be used. Preferred are those fats with melting points above room temperature (25°-28° C.).

Optionally, a thickening agent may be added to the aqueous phase of the emulsion. If added, the thickening agent is present at a concentration of from about 0.1 to about 2.0 percent, preferably 0.1 to 0.5 percent, based on the weight of the total emulsion. Suitable thickening agents include agar, carrageenans, guar gum, locust bean gum, pectins, xanthan gums, methylcellulose, methylethylcellulose, carboxymethylcellulose, hydroxypropylcellulose, hydroxypropylmethylcellulose, gelatin and alginates.

Low pH appears to aid in stabilization of the emulsion against microbial attack, and is additionally preferred and advantageous in formulation of acidic food systems such as salad dressing, mayonnaise and dips. For these applications, it is preferred that the emulsion have a pH in the range of 3-5.

The pH of the emulsion may if desired, be controlled by addition of one or more pH-adjusting agents. Suitable pH-adjusting agents are selected from the group consisting of hydrochloric, sulfuric, phosphoric, acetic, lactic, malic, tartaric and citric acids; salts thereof; and combinations thereof.

Since exposure of a low-pH emulsion to elevated temperature may cause partial hydrolysis of the protein content of the emulsion, it is preferable to carry out adjustment to the pH 3 to 4 range after the heating step.

Appropriate preservatives such as potassium sorbate, sodium benzoate, methyl paraben, propyl paraben, or combinations thereof, may also be added to the emulsion.

The emulsion of the present invention is prepared by mixing fat or oil, an emulsifier, an aqueous medium, a protein, a carbohydrate, and, if desired, antimicrobial agents, and stirring the mixture. The solution or suspension of the protein in the aqueous medium is heated to induce partial denaturation either before or after addition of the oil phase. Temperature limits for this step are dictated by practical considerations: Below about 60° C., denaturation is impractically slow, while the aqueous medium would boil at a temperature above 100° C. It will be readily apparent to one skilled in the art that a temperature above 100° C. could be achieved if the process were run under pressure. This is not necessary, however, since practical denaturation rates can be achieved at temperatures below 100° C.

Having described the invention in general terms, reference is now made to specific examples. It is to be understood that these examples are not meant to limit the present invention, the scope of which is determined by the appended claims.

EXAMPLE 1

A mixture of 50 grams of soybean oil, 1.5 grams of Atmos 150, 0.5 gram of Tween 60, and 0.5 gram of Span 60 was heated to 60° C. to dissolve the surfactants. A solution of 100 grams of polydextrose in 275 grams of deionized water was then slowly added with stirring. A W/O emulsion formed initially, then inverted upon continued addition to an O/W emulsion, as indicated by a pronounced decrease in viscosity. Stirring was continued during addition of 25 grams of P-20 egg white solids (Henningsen Foods, Inc.). The emulsion was then heated to 75°-80° C., held at this temperature for 30 minutes, cooled to 40° C., passed through a hand homogenizer four times, transferred to a sterile polyethylene jar, and refrigerated. Analysis by laser light scattering showed a mean particle size of 3.0 microns.

EXAMPLE 2

With stirring, 25.0 grams of Savorpro 75 whey protein concentrate (Express Foods Co.) were added to a solution of 100 grams of polydextrose in 275 grams of deionized water. After the protein was well dispersed, the aqueous mixture was heated to 68°-70° C., held at this temperature for 30 minutes, then cooled rapidly to 35° C. In a separate vessel, a mixture of 50 grams of Satina 44 partially hydrogenated palm kernel oil (Durkee Industrial Foods Corp.), 1.5 grams of Atmos 150, 0.5 grams of Tween 60, and 0.5 grams of Span 60 was heated to 60° C. with stirring to melt the fat and dissolve the surfactants. The aqueous protein dispersion was then added slowly with stirring. A W/O emulsion formed initially, as indicated by a relatively high viscosity. Upon contined addition, the mixture inverted to an O/W emulsion, as indicated by a pronounced decrease in viscosity. The emulsion was passed through a hand homogenizer four times, transferred to a sterile polyethylene jar, and refrigerated. Analysis by light laser scattering showed a mean particle size of 1.7 micron.

EXAMPLE 3

With stirring, 50 grams of Savorpro 75 whey protein concentrate (Express Foods Co.) were added to a solution of 200 grams of polydextrose in 550 grams of deionized water. Stirring was continued as the dispersion was heated to 68°-70° C. and held at this temperature for 30 minutes, then cooled in an ice bath. In a separate vessel, a mixture of 100 grams of Satina 44 partially hydrogenated palm kernel oil (Durkee Industrial Foods Corp.) and 5.0 grams of lecithin was heated to 60° C. with stirring to melt the fat and disperse the lecithin. The chilled aqueous protein dispersion was then slowly added to the warm, stirred fat mixture. The initially-formed W/O emulsion inverted upon continued addition to an O/W emulsion, as indicated by a dramatic drop in viscosity. The emulsion was passed through a hand homogenizer four times, transferred to a sterile polyethylene jar, and refrigerated. Analysis by laser light scattering showed a mean particle size of 1.2 microns.

EXAMPLE 4

In a blender running at low speed, 2.5 grams of Keltone HV sodium alginate (Kelco division of Merck and Co.) were slowly added to 668 grams of sterile water, and blending was continued until solution was complete. The following materials were then added in sequence, with continued blending: 213 grams of Maltrin M150 maltodextrin (Grain Processing Corp.), 60.8 grams of sorbitol, 28.0 grams of PP760 soy protein isolate (Protein Technologies International), and 1.1 gram of potassium sorbate. The resulting aqueous mixture was transferred to a round-bottom flask and stirred continuously as it was heated to 72° C. and held at this temperature for 30 minutes, then cooled to 38°-40° C. In a separate vessel, a mixture of 72.9 grams of Satina 44 partially hydrogenated palm kernel oil, 48.6 grams of Hydrol 100 partially hydrogenated coconut oil, and 6.1 grams of Dur-Em 117 mono/diglyceride emulsifier (all from Durkee Industrial Foods Corp.) was heated to 40° C. with stirring until homogeneous. The aqueous protein dispersion was then added slowly. The initially-formed W/O emulsion inverted to an O/W emulsion upon continued addition, as indicated by a pronounced decrease in viscosity. The emulsion was chilled to 10° C., transferred to a sterile polyethylene jar, and refrigerated.

EXAMPLE 5

A solution of 243 grams of Maltrin M150 maltodextrin (Grain Processing Corp.) and 20.1 grams of dibasic potassium phosphate ($K_2HPO_4.3H_2O$) was adjusted from pH 8.0 to pH 7.5 with lactic acid. With stirring, 12.1 grams of PP760 soy protein isolate (Protein Technologies International) were added, and stirring was continued until the mixture was homogeneous. The mixture was heated to 68° C. for 30 minutes, then cooled to 38°-40° C. In a separate vessel, a mixture of 121.5 grams of Satina 44 partially hydrogenated palm kernel oil and 6.1 grams of Dur-Em 117 mono/diglyceride emulsifier (both from Durkee Industrial Foods Corp.) was heated to 40° C. with stirring to melt the fat and dissolve the surfactant. With continued stirring, the aqueous protein dispersion was then slowly added. The initially-formed W/O emulsion inverted to an O/W emulsion upon continued addition, as indicated by a pronounced decrease in viscosity. The resulting emulsion was passed through a hand homogenizer four times, transferred to a sterile polyethylene jar, and refrigerated. Analysis by laser light scattering showed a mean particle size of 2.1 microns.

EXAMPLE 6

In a blender running at low speed, 2.5 grams of Keltone HV sodium alginate (Kelco division of Merck and Co.) were slowly added to 668 grams of sterile water, and blending was continued until solution was complete. The following materials were then added in sequence, with continued blending: 213 grams of Maltrin M150 maltodextrin (Grain Processing Corp.), 60.8 grams of sorbitol, 28.0 grams of PP760 soy protein isolate (Protein Technologies International), 5.5 grams of dibasic potassium phosphate ($K_2HPO_4.3H_2O$). The mixture was adjusted to pH 4.5 with lactic acid, transferred to a round-bottom flask, heated with stirring to 72° C. for 30 minutes, and cooled to 38°-40° C. In a separate vessel, a mixture of 72.9 grams of Satina 44 partially hydrogenated palm kernel oil, 48.6 grams of Hydrol 100 partially hydrogenated coconut oil, and 6.1 grams of Dur-Em 117 mono/diglyceride emulsifier (all from Durkee Industrial Foods Corp.) was heated to 40° C. with stirring until homogeneous. The aqueous protein dispersion was then added slowly. The initially-formed W/O emulsion inverted to an O/W emulsion upon continued addition, as indicated by a pronounced decrease in viscosity. The emulsion was chilled to 10° C., transferred to a sterile polyethylene jar, and refrigerated.

EXAMPLE 7

Semicontinuous Process

A 22-liter stirred reactor (Reactor number 1) was charged with 2000 grams of Satina 44 partially hydrogenated palm kernel oil (Durkee Industrial Foods Corp.) and 100 grams of polysorbate 80, and heated while stirring. When the mixture was fluid and homogeneous, 11940 grams of sterile water were added slowly, with the rate of addition controlled to keep the emulsion temperature above 40° C. The following dry materials were then added in the order given, with rates of addition controlled to allow good dispersion and solubilization of each: 5500 grams of Maltrin M150 maltodextrin (Grain Processing Corp.), 75.0 grams of dibasic potassium phosphate ($K_2HPO_4.3H_2O$), and 200 grams of PP760 soy protein isolate (Protein Technologies International). The emulsion was heated to 68° C. for 30 minutes. Transfer to a homogenizer—heat exchanger train was then initiated. The emulsion was pumped through the two-stage homogenizer at a rate of approximately 330 milliliters per minute, homogenized at 4000 and 1000 pounds per square inch, cooled to about 10° C. by passage through a heat exchanger, and collected in a 5-gallon polyethylene container. During the pasteurization and homogenization steps, a second batch of emulsion was made up in a 22-liter stirred reactor (Reactor number 2) identical to the first. The makeup and pasteurization steps were timed to be complete at about the time homogenization and chilling of the first batch was complete. The feed to the transfer pump was then switched from Reactor number 1 to Reactor number 2. A third batch of emulsion was then made up in Reactor number 1, and the cycle was repeated. Analysis by laser light scattering showed a mean particle size of 0.6 microns.

EXAMPLE 8

A mixture of 2000 grams of Tem Plus 95 partially hydrogenated soybean oil (Bunge Foods Co.) and 50.0 grams of polysorbate 80 was heated with stirring to melt the fat and dissolve the emulsifier. While stirring at 300 rpm, 8000 grams of sterile water were added, with the rate of addition and heat input controlled to keep the emulsion temperature at about 45°-50° C. With continued stirring, 5500 grams of Maltrin M150 maltodextrin (Grain Processing Corp.), 75.0 grams of dibasic potassium phosphate ($K_2HPO_4.3H_2O$), and 200 grams of monobasic potassium phosphate ($KH_2PO_4$) were then added. A dispersion of 200 grams of PP760 soy protein isolate (Protein Technologies International) in 3940 grams of sterile water was made up separately in a blender at medium speed, then slowly added to the stirred emulsion. Stirring rate was increased to 500 rpm, and the emulsion was heated to 68° C. and held at this temperature for 30 minutes. Using a Shimatzu—SALD 1100 Particle Size Analyzer, a sample of the hot emulsion was found to have a mean particle size of 5.0 microns. The hot emulsion was homogenized in a single pass through an APV-Gaulin two-stage homogenizer (4000 pounds per square inch followed by 1000 pounds per square inch), then cooled to below 20° C. with an in-line heat exchanger attached to the homogenizer outlet. Particle size analysis of samples gave the following results: hot sample taken before heat exchanger, 1.4 microns; cold sample taken after heat exchanger, 2.6 microns. The chilled emulsion was transferred to a sanitized polyethylene container and refrigerated for 24 hours prior to testing in food.

EXAMPLE 9

A one-liter portion of emulsion prepared as described in Example 8 was adjusted from pH 7.3 to pH 4.4 by addition of lactic acid.

EXAMPLE 10

In a blender running at low speed, 1944 grams of Maltrin M150 maltodextrin (Grain Processing Corp.) and 120.8 grams of dibasic potassium phosphate ($K_2HPO_4.3H_2O$) were added to 1083 grams of sterile water. Blending was continued until solution was complete, the pH was adjusted from 8.0 to 7.5 with lactic acid, 96.4 grams of PP760 soy protein isolate (Protein Technologies International) were added, and blending was continued until the dispersion was homogeneous. The mixture was transferred to a round bottom flask and stirred continuously while being heated to 68° C., held at this temperature for 30 minutes, and cooled to 38°-40° C. In a separate vessel, a mixture of 972 grams of Satina 44 partially hydrogenated palm kernel oil and 48.4 grams of Dur-Em 117 mono/diglyceride emulsifier (both from Durkee Industrial Foods Corp.) was heated to 40°-50° C. with stirring until liquified and homogeneous. The aqueous protein dispersion was then added slowly. The initially-formed W/O emulsion inverted, upon continued addition, to an O/W emulsion, as indicated by a pronounced decrease in viscosity. The emulsion was passed through an APV-Gaulin two-stage homogenizer (4000 pounds per square inch followed by 1000 pounds per square inch), transferred to a sanitized polyethylene jar, and refrigerated. Analysis by laser light scattering showed a mean particle size of 3.4 microns.

EXAMPLE 11

In a blender running at low speed, 9.1 grams of Keltone HV sodium alginate (Kelco division of Merck and Co.) were slowly added to 2424 grams of sterile water, and blending was continued until solution was complete. The following materials were then added in sequence with continued blending: 769 grams of Maltrin M150 maltodextrin (Grain Processing Corp.), 221 grams of sorbitol, and 102 grams of PP760 soy protein isolate (Protein Technologies International). Blending was continued until the mixture was homogeneous. The mixture was then transferred to a round-bottom flask and stirred continuously as it was heated to 72° C., held at this temperature for 30 minutes, and cooled to 38°-40° C. In a separate vessel, a mixture of 441 grams of anhydrous milkfat (Mid-America Farms) and 22.1 grams of polysorbate 80 was heated to 40°-50° C. with stirring until liquified and homogeneous. The aqueous protein dispersion was then added slowly. The initially-formed W/O emulsion inverted, upon continued addition, to an O/W emulsion, as indicated by a pronounced decrease in viscosity. With rapid stirring, the emulsion was cooled to 5°-10° C. It was then transferred to a sanitized polyethylene jar and refrigerated. Analysis by laser light scattering showed a mean particle size of 7.8 microns.

EXAMPLE 12

| Frozen Dessert | |
|---|---|
| Ingredients | Weight percent |
| Heavy cream | 5.60 |
| Emulsion of Example 4 | 25.00 |
| Sucrose | 15.00 |
| Powdered skim milk | 11.00 |
| Vanilla extract | 1.00 |
| Dricoid 200 emulsifier (Kelco) | 0.20 |
| Deionized water | 42.20 |

| -continued | |
|---|---|
| Frozen Dessert | |
| Ingredients | Weight percent |
| | 100.00 |

The water, preheated to 70° C., was added to a blender jar, the Dricoid 200 was added, and the mixture was blended for 3 minutes at medium speed. The powdered skim milk and sugar were added, blending was continued for 3 minutes, the emulsion was added, and blending was continued for 5 minutes. The mixture was pasteurized for 30 minutes at 70° C., then immediately homogenized in two passes (2500 pounds per square inch followed by 500 pounds per square inch), rapidly cooled in an ice bath, and refrigerated overnight. Vanilla flavor was added, and the mixture was frozen with a small commercial ice cream freezer (Taylor Model 103). The resulting low-fat ice cream, containing 4.9% fat, was found acceptable when compared organoleptically with a control ice cream containing 13.5% fat.

EXAMPLE 13

| Salad Dressing | | |
|---|---|---|
| Ingredients | Weight Percent | |
| Deionized water | 27.60 | |
| M100 maltodextrin (Grain Processing Corp.) | 1.70 | |
| Polysorbate 60 | 0.10 | A |
| Salt | 1.12 | |
| Sugar | 1.99 | |
| Propylene glycol alginate | 0.16 | B |
| Potassium sorbate | 0.10 | C |
| Sodium benzoate | 1.10 | |
| Distilled white vinegar | 18.81 | D |
| Horseradish extract | 0.10 | |
| Garlic powder | 0.30 | |
| Mustard powder | 0.55 | |
| Onion powder | 0.30 | E |
| Worchester powder | 0.07 | |
| Lemon Juice | 0.10 | |
| Xanthan gum | 0.40 | F |
| Emulsion of Example 5 | 46.50 | |
| | 100.00 | |

The ingredients of group A were mixed in a blender at medium speed until a solution was obtained. With continued mixing at medium speed, the ingredients of groups, B, C, D, and E were added at one-minute intervals. Blending speed was increased, F was added during 2 minutes, blending was continued for 5 minutes, the emulsion was added during 5 minutes, blending was continued for 5 minutes, and the mixture was homogenized at 1000 pounds per square inch. The resulting salad dressing, containing 5.1% fat, was found acceptable when compared organoleptically with a control salad dressing containing 46.5% fat.

EXAMPLE 14

| Vichyssoise | |
|---|---|
| | Weight percent |
| Ingredients for soup base | |
| 5:1 mixture of leeks and onions | 32.74 |
| Peeled potatoes | 26.78 |
| Chicken broth | 38.69 |
| Butter | 1.79 |

| -continued | |
|---|---|
| Vichyssoise | |
| | Weight percent |
| | 100.00 |
| Ingredients for finished soup | |
| Soup base | 75.0 |
| Emulsion of Example 8 | 25.0 |
| | 100.00 |

The leeks were cleaned and trimmed. Leeks and onions were sliced thinly and sauteed for 15 minutes until golden in color. Peeled, sliced potatoes and chicken broth were added. The mixture was covered and simmered for 40 minutes with occasional stirring, pureed in a blender until smooth, and refrigerated until well chilled. The emulsion was added, and the mixture was blended in a mixer at slow speed for about one minute. The resulting vichyssoise, containing 3.8% fat, was found acceptable when compared organoleptically with a control containing 10.7% fat.

EXAMPLE 15

| Frosting | |
|---|---|
| Ingredients | Weight percent |
| 10x powdered sugar | 67.50 |
| Emulsion of Example 10 | 19.00 |
| Heavy cream | 7.00 |
| M100 maltodextrin (Grain Processing Corp.) | 3.75 |
| Vanilla extract | 0.75 |
| Water | 2.00 |
| | 100.00 |

The ingredients were blended in a Sunbeam Mixmaster for one minute on medium-high speed. The resulting frosting, containing 7.0% fat, was found acceptable when compared organoleptically with a control containing 20.2% fat.

EXAMPLE 16

| Cookie Filling | |
|---|---|
| Ingredients | Weight percent |
| 10x powdered sugar | 34.57 |
| 6x powdered sugar | 34.57 |
| Emulsion of Example 10 | 12.55 |
| Crisco shortening (Proctor and Gamble) | 9.65 |
| Polydextrose | 4.45 |
| Water | 3.86 |
| Vanillin | 0.15 |
| Vanilla flavor | 0.10 |
| Salt | 0.10 |
| | 100.00 |

The emulsion, shortening, and water were blended in a Sunbeam Mixmaster for one minute at medium speed. Dry ingredients were mixed by hand, then slowly added during a two-minute period with the mixer running at medium speed. Mixing was continued for one minute. The resulting cookie filling, containing 12.5% fat, was found acceptable when compared organoleptically with a control containing 27.5% fat.

EXAMPLE 17

| Dip | |
|---|---|
| Ingredients | Weight percent |
| Emulsion of Example 9 | 72.00 |
| Sour cream | 20.00 |
| Garlic herb blend | 4.00 |
| Mira Gel 463 starch (Staley Corp.) | 1.50 |
| Mira Thick 468 starch (Staley Corp.) | 1.50 |
| Natural sour cream flavor R-7365/ 261917 (Haarmann and Reimer Corp.) | 0.50 |
| Artificial sour cream flavor 7-7038/ 261062 (Haarmann and Reimer Corp.) | 0.50 |
| | 100.00 |

In a blender running at medium speed, the starches and flavors were slowly added to the emulsion during a period of about one minute, and blending was continued for one minute. The mixture was transferred to a mixing bowl and mixed by hand with the sour cream and herb mix. The mixture was refrigerated for several hours. The resulting dip, containing 11.0% fat, was found acceptable when compared organoleptically with a control containing 18.2% fat.

EXAMPLE 18

| Chocolate Mousse | |
|---|---|
| Ingredients | Weight percent |
| Emulsion of Example 11 | 33.96 |
| Semisweet chocolate | 20.72 |
| Egg whites | 21.31 |
| Egg yolds | 10.96 |
| Heavy cream | 8.40 |
| Water | 3.65 |
| Vanilla extract | 1.00 |
| | 100.00 |

The water and chocolate were heated in a double boiler until the chocolate melted. The egg yolks were beaten slighly, a small amount of the chocolate mixture was added and mixed in well, and the resulting mixture was added to the remaining chocolate-water mixture in the double boiler and cooked for 1.5 minutes with constant stirring. The mixture was removed from heat, and the vanilla extract was added. The emulsion was aerated by whipping, then folded into the mixture. The egg whites were whipped until slightly stiff and gently folded into the mixture. The mixture was stirred until well blended, covered, and refrigerated overnight. The resulting chocolate mousse, containing 14.3% fat, was found acceptable when compared organoleptically with a control containing 23.3% fat.

I claim:

1. A two-phase emulsion comprising a continuous aqueous phase and a dispersed phase, said emulsion containing, based on the weight of the total emulsion, from about 1 to about 70 percent of carbohydrate, from about 0.05 to about 12 percent of a substantially heat denatured protein, from about 1 to about 50 percent of an edible fat or oil, and an emulsifier; wherein substantially all of said fat or oil and at least a portion of said protein are in said dispersed phase in the form of protein-fat or protein-oil aggregates; and wherein the nonaggregated protein is either dissolved or suspended in said aqueous phase; said emulsion useful as a low calorie fat substitute.

2. The emulsion of claim 1, wherein the mean size of said aggregates is from about 0.1 micron to about 100 microns.

3. The emulsion of claim 1, wherein the mean size of said aggregates is from about 0.2 micron to about 20 microns.

4. The emulsion according to claim 1 further comprising the addition of one or more thickening agents.

5. The emulsion according to claim 4 wherein said thickening agents are selected from the group consisting of alginates, xanthan gum, locust bean gum, guar gum, agar, carrageenans, pectins, methylcellulose, methylethylcellulose, carboxymethylcellulose, hydroxypropylcellulose, hydroxypropylmethylcellulose, and gelatin; and combinations thereof.

6. The emulsion according to claim 1 further comprising one or more pH-adjusting agents.

7. The emulsion according to claim 6 wherein said pH-adjusting agent is selected from the group consisting of hydrochloric, sulfuric, phosphoric, acetic, lactic, malic, tartaric, and citric acids; salts thereof; and combinations thereof.

8. The emulsion according to claim 1 wherein said protein is selected from the group consisting of substantially purified proteins, egg white and egg white solids.

9. The emulsion according to claim 8 wherein said purified protein is selected from the group consisting of whey protein, milk protein isolates, milk protein hydrolyzates, egg albumin, soy protein isolates, beef plasma protein; and combinations thereof.

10. The emulsion according to claim 9 wherein said purified protein is soy protein isolate.

11. The emulsion according to claim 9 wherein said purified protein is egg albumin.

12. The emulsion according to claim 9 wherein said purified protein is whey protein.

13. The emulsion according to claim 1 wherein said carbohydrate is selected from the group consisting of corn syrup solids, corn syrup, dextrins, sucrose, starches, modified starches, dextrose, fructose, maltodextrins, polydextrose, polyhydric alcohols; and combinations thereof.

14. The emulsion according to claim 13 wherein said carbohydrate is polydextrose.

15. The emulsion according to claim 13 wherein said carbohydrate is maltodextrin.

16. The emulsion according to claim 1 wherein said emulsifier is selected from the group consisting of lecithins, monoglycerides, diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, and citric with fatty acids or fatty alcohols, esters of acids selected from the group consisting of fumaric, lactic, tartaric, citric, acetic, and succinic with mono- or diglycerides; and combinations thereof.

17. The emulsion according to claim 1 wherein said edible fat or oil is selected from the group consisting of vegetable fats and oils, hydrogenated vegetable fats and oils, refined animal fats, polyunsaturated oils, partially hydrogenated canola oil, partially hydrogenated cottonseed oil, partially hydrogenated soybean oil, partially hydrogenated corn oil, partially hydrogenated sunflower oil, partially hydrogenated safflower oil; and combinations thereof.

18. The emulsion according to claim 1 wherein said fat has a melting point above 25° C.

19. The emulsion according to claim 1 wherein said carbohydrate is present at a concentration of from about 5 to about 60 percent.

20. The emulsion according to claim 1 wherein said protein is present at a concentration of from about 0.5 to about 5 percent.

21. The emulsion according to claim 1 wherein said edible fat or oil is present at a concentration of from about 5 to about 40 percent.

22. The emulsion of claim 1 wherein said emulsifier is present at a concentration of from about 0.1 to about 2.5 percent.

23. A foodstuff having at least a portion of the normally present triglyceride replaced by the emulsion of claim 1.

24. A mayonaise composition containing the emulsion of claim 1.

25. A salad dressing containing the emulsion of claim 1.

26. A frozen dessert containing the emulsion of claim 1.

27. A soup containing the emulsion of claim 1.

28. A dip for chips, crackers or vegetables containing the emulsion of claim 1.

29. A filling for cakes or cookies containing the emulsion of claim 1.

30. A cake frosting containing the emulsion of claim 1.

31. A confection having at least a portion of the normally present triglyceride replaced by the emulsion of claim 1.

32. A whipped dessert containing the emulsion of claim 1.

33. A process for preparing the emulsion of claim 1 comprising:
(a) to a mixture of a fat or oil and an emulsifier, adding an aqueous medium in which is dissolved or suspended a protein, said aqueous medium also containing carbohydrate;
(b) stirring said mixture and heating the mixture to partially denature said protein so as to form protein-fat or protein-oil aggregates.

34. A process according to claim 33 wherein said mixture is heated to a temperature in the range of about 60° C. to about 100° C. for a time sufficient to partially denature said protein.

35. A process according to claim 33 further comprising the addition of one or more thickening agents.

36. A process according to claim 35 wherein said thickening agents are selected from the group consisting of alginates, xanthan gum, locust bean gum, guar gum, agar, carrageenans, pectins, methylcellulose, methylethylcellulose, carboxymethylcellulose, hydroxypropylcellulose, hydroxypropylmethylcellulose and gelatin; and combinations thereof.

37. A process according to claim 33 further comprising the addition of one or more pH-adjusting agents.

38. A process according to claim 37 wherein said pH-adjusting agent is selected from the group consisting of hydrochloric, sulfuric, phosphoric, acetic, lactic, malic, tartaric, and citric acids; salts thereof; and combinations thereof.

39. A process according to claim 33 wherein said protein is selected from the group consisting of purified protein, egg white, and egg white solids.

40. A process according to claim 39 wherein said purified protein is selected from the group consisting of whey protein, milk protein isolates, milk protein hydrolyzates, egg albumin, soy protein isolates, beef plasma protein; and combinations thereof.

41. A process according to claim 40 wherein said purified protein is soy protein isolate.

42. A process according to claim 40 wherein said purified protein is egg albumin.

43. A process according to claim 40 wherein said purified protein is whey protein.

44. A process according to claim 33 wherein said carbohydrate is selected from the group consisting of corn syrup solids, corn syrup, dextrins, sucrose, starches, modified starches, dextrose, fructose, maltodextrins, polydextrose, and polyhydric alcohols; and combinations thereof.

45. A process according to claim 44 wherein said carbohydrate is polydextrose.

46. A process according to claim 44 wherein said carbohydrate is maltodextrin.

47. A process according to claim 33 wherein said emulsifier is selected from the group consisting of lecithins, monoglycerides, diglycerides, diacetyltartaric acid esters of mono- and diglycerides, monosodium phosphate derivatives of mono- and diglycerides, polyol fatty acid esters; sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, and citric with fatty acids or fatty alcohols, esters of acids selected from the group consisting of fumaric, lactic, tartaric, citric, acetic, and succinic with mono- or diglycerides; and combinations thereof.

48. A process according to claim 33 wherein said fat or oil is selected from the group consisting of vegetable fats and oils, hydrogenated vegetable fats and oils, refined animal fats, polyunsaturated oils, partially hydrogenated canola oil, partially hydrogenated cottonseed oil, partially hydrogenated soybean oil, partially hydrogenated corn oil, partially hydrogenated sunflower oil, partially hydrogenated safflower oil; and combinations thereof.

49. A process for preparing the emulsion of claim 1 comprising:
(a) heating an aqueous medium in which is dissolved or suspended a protein in order to partially denature said protein, said aqueous medium also containing carbohydrate;
(b) adding said aqueous medium to a mixture of a fat or oil and an emulsifier; and
(c) stirring the resulting mixture in order to form protein-fat or protein-oil aggregates.

50. A process according to claim 49 wherein said aqueous medium has been heated to a temperature in the range of about 60° C. to about 100° C. for a time sufficient to partially denature said protein.

51. A process according to claim 49 further comprising the addition of one or more thickening agents.

52. A process according to claim 51 wherein said thickening agents are selected from the group consisting of alginates, xanthan gum, locust bean gum, guar gum, agar, carrageenans, pectins, methylcellulose, methylethylcellulose, carboxymethylcellulose, hydroxypropylcellulose, hydroxypropylmethylcellulose and gelatin; and combinations thereof.

53. A process according to claim 49 further comprising the addition of one or more pH-adjusting agents.

54. A process according to claim 53 wherein said pH-adjusting agent is selected from the group consisting of hydrochloric, sulfuric, phosphoric, acetic, lactic, malic, tartaric and citric acids; salts thereof, and combinations thereof.

55. A process according to claim 49 wherein said protein is selected from the group consisting of substantially purified protein, egg white, and egg white solids.

56. A process according to claim 55 wherein said purified protein is selected from the group consisting of whey protein, milk protein isolates, milk protein hydrolyzates, egg albumin, soy protein isolates, beef plasma protein; and combinations thereof.

57. A process according to claim 56 wherein said purified protein is soy protein isolate.

58. A process according to claim 56 wherein said purified protein is egg albumin.

59. A process according to claim 56 wherein said purified protein is whey protein.

60. A process according to claim 49 wherein said carbohydrate is selected from the group consisting of corn syrup solids, corn syrup, dextrins, sucrose, starches, modified starches, dextrose, fructose, maltodextrins, polydextrose, and polyhydric alcohols; and combinations thereof.

61. A process according to claim 60 wherein said carbohydrate is polydextrose.

62. A process according to claim 60 wherein said carbohydrate is maltodextrin.

63. A process according to claim 49 wherein said emulsifier is selected from the group consisting of lecithins, monoglycerides, diglycerides, diacetyltartaric acid esters of mono- and diglycerides, monosodium phosphate derivatives of mono- and diglycerides, polyol fatty acid esters, sorbitan fatty acid esters, polyoxyethylene mono- and diglycerides, polyoxyethylene sorbitan fatty acid esters, sucrose fatty acid esters, esters of acids selected from the group consisting of fumaric, lactic, tartaric, and citric with fatty acids or fatty alcohols, esters of acids selected from the group consisting of fumaric, lactic, tartaric, citric, acetic, and succinic with mono- or diglycerides; and combinations thereof.

64. A process according to claim 49 wherein said fat or oil is selected from the group consisting of vegetable fats and oils, hydrogenated vegetable fats and oils, refined animal fats, polyunsaturated oils, partially hydrogenated canola oil, partially hydrogenated cottonseed oil, partially hydrogenated soybean oil, partially hydrogenated corn oil, partially hydrogenated sunflower oil, partially hydrogenated safflower oil; and combinations thereof.

65. A method for reducing the fat content of a food containing triglyceride comprising replacing at least a portion of the normally present triglyceride with an emulsion produced by the process of claim 33.

66. A method for reducing the fat content of a food containing triglyceride comprising replacing at least a portion of the normally present triglyceride with an emulsion produced by the process of claim 49.

67. A method for reducing the fat content of a food containing triglyceride comprising replacing at least a portion of the normally present triglyceride with an emulsion of claim 1.

68. A foodstuff having at least a portion of the normally present triglyceride replaced by an emulsion produced by the process of claim 33.

69. A foodstuff having at least a portion of the normally present triglyceride replaced by an emulsion produced by the process of claim 49.

* * * * *